US012670599B2

(12) United States Patent
Lee et al.

(10) Patent No.: US 12,670,599 B2
(45) Date of Patent: Jun. 30, 2026

(54) METHOD OF OPERATING IMAGE PROCESSOR GENERATING TOP-DOWN HEAT MAP AND ELECTRONIC DEVICE HAVING THE IMAGE PROCESSOR

(71) Applicant: Electronics and Telecommunications Research Institute, Daejeon (KR)

(72) Inventors: Yongjin Lee, Daejeon (KR); Sung Yup Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 314 days.

(21) Appl. No.: 18/472,022

(22) Filed: Sep. 21, 2023

(65) Prior Publication Data

US 2024/0185427 A1     Jun. 6, 2024

(30) Foreign Application Priority Data

Dec. 2, 2022     (KR) ......................... 10-2022-0166648

(51) Int. Cl.
*G06T 7/11* (2017.01)
*G06N 3/0464* (2023.01)
(Continued)

(52) U.S. Cl.
CPC .......... *G06T 7/11* (2017.01); *G06V 30/18057* (2022.01); *G06N 3/0464* (2023.01); *G06T 2207/10024* (2013.01); *G06V 10/955* (2022.01)

(58) Field of Classification Search
CPC ............ G06T 2207/10024; G06T 7/11; G06N 3/0464; G06V 10/82; G06V 10/454; G06V 10/25; G06V 30/18057
(Continued)

(56) References Cited

U.S. PATENT DOCUMENTS 11,023,730 B1     6/2021 Zhou et al.
12,211,203 B2     1/2025 Kang et al.
(Continued)

FOREIGN PATENT DOCUMENTS

KR     10-2020-0069209     6/2020
KR     10-2021-0016861     2/2021
(Continued)

OTHER PUBLICATIONS

Bearman et al., "RTI Surface Normal Calibration with a 3D Printed Spatial Target: Turning Images into Data", Jun. 2, 2014, pp. 1-8.
(Continued)

*Primary Examiner* — Kenny A Cese

(74) *Attorney, Agent, or Firm* — KILE PARK REED & HOUTTEMAN PLLC

(57)     ABSTRACT

Disclosed is an operating method of an image processor communicating with a memory device that includes receiving raw image data from the memory device, receiving first to n-th filter data from the memory device, generating first to n-th heat maps based on a convolution neural network (CNN) operation of the first to n-th filter data and the raw image data, extracting a first region of interest (ROI) from a first heat map among the first to n-th heat maps, extracting a first portion corresponding to the first ROI from a second heat map among the first to n-th heat maps, and generating a first top-down heat map by applying the first portion of the second heat map to the first ROI of the first heat map. 'n' is a natural number greater than '2'.

15 Claims, 7 Drawing Sheets

(51) Int. Cl.
  *G06V 10/94* (2022.01)
  *G06V 30/18* (2022.01)
(58) Field of Classification Search
  USPC .......................................................... 382/164
  See application file for complete search history.

(56) References Cited

U.S. PATENT DOCUMENTS

| | | | |
|---|---|---|---|
| 2013/0188070 A1 | 7/2013 | Lee et al. | |
| 2018/0121744 A1 | 5/2018 | Kim et al. | |
| 2018/0165548 A1* | 6/2018 | Wang ....................... | G06N 3/09 |
| 2018/0260664 A1 | 9/2018 | Krishnamurthy et al. | |
| 2018/0342050 A1* | 11/2018 | Fitzgerald ................ | G06N 3/09 |
| 2020/0167641 A1 | 5/2020 | Dhurandhar et al. | |
| 2020/0320381 A1 | 10/2020 | Venkatraman et al. | |
| 2023/0040470 A1* | 2/2023 | Ermans .................... | G06N 3/08 |
| 2023/0093503 A1* | 3/2023 | Byun ................... | G06N 3/0464 |
| | | | 382/157 |

| | | | |
|---|---|---|---|
| 2023/0394783 A1* | 12/2023 | Matsunaga ........... | G06F 16/583 |
| 2024/0312183 A1* | 9/2024 | Kim ....................... | A61B 8/085 |

FOREIGN PATENT DOCUMENTS

| | | | | |
|---|---|---|---|---|
| KR | 10-2022-0092589 | 7/2022 | | |
| WO | WO-2022038855 A1 * | 2/2022 | ........... | G06V 10/764 |
| WO | WO-2022173233 A1 * | 8/2022 | ............. | G16H 30/20 |

OTHER PUBLICATIONS

Zhou et al., "Learning Deep Features for Discriminative Localization", CVPR, 2016, pp. 2921-2929.

Selvaraju et al., "Grad-CAM: Visual Explanations from Deep Networks via Gradient-based Localization", ICCV, 2017, pp. 618-626.

Sundararajan et al., "Axiomatic Attribution for Deep Networks", ICML, Jun. 13, 2017, 11 total pages.

"Integrated gradients", Web site: https://www.tensorflow.org/tutorials/interpretability/integrated_gradients, Retrieved Sep. 6, 2023.

* cited by examiner

FIG. 1

HM1
(Resolution is low)

First ROI

Apply first portion
of second heat map to
first ROI of first
heat map

HM2
(Resolution is high)

First portion(P1)

TD-HM1

First temperature region

Second temperature region

Third temperature region

Fourth temperature region

FIG. 4

METHOD OF OPERATING IMAGE PROCESSOR GENERATING TOP-DOWN HEAT MAP AND ELECTRONIC DEVICE HAVING THE IMAGE PROCESSOR

CROSS-REFERENCE TO RELATED APPLICATIONS

This application claims priority under 35 U.S.C. § 119 to Korean Patent Application No. 10-2022-0166648 filed on Dec. 2, 2022, in the Korean Intellectual Property Office, the disclosures of which are incorporated by reference herein in their entireties.

BACKGROUND

Embodiments of the present disclosure described herein relate to an image processor, and more particularly, relate to an operating method of an image processor for generating a top-down heat map, and an electronic device including the image processor.

An image sensor may capture an object. The image sensor may generate image data including object data. A convolutional neural network may be applied to determine an object included in an image from the image data. The convolutional neural network may be a deep neural network using convolution. Class activation map (CAM), Grad-CAM, or integrated gradients (IG) techniques may be used as examples of techniques for interpreting data used for a convolutional neural network to determine an object, as a basis. The basis used for the convolutional neural network to determine an object may be explained by using the heat map generated by techniques such as CAM, Grad-CAM, and IG.

The heat map generated by CAM or Grad-CAM may display the basis for object discrimination in units of regions, but may have a lower resolution than the heat map generated by the IG technique.

On the other hand, the heat map generated by the IG technique has a higher resolution than the heat map generated by the CAM technique, but it is difficult to display the basis for object determination in units of region.

SUMMARY

Embodiments of the present disclosure provide an operating method of an image processor generating a top-down heat map, and an electronic device including the image processor.

According to an embodiment, an image processor communicates with a memory device. An operating method of an image processor includes receiving raw image data from the memory device, receiving first to n-th filter data from the memory device, generating first to n-th heat maps based on a convolution neural network (CNN) operation of the first to n-th filter data and the raw image data, extracting a first region of interest (ROI) from a first heat map among the first to n-th heat maps, the first heat map being generated by sequentially applying n-th to first filter data to the raw image data, extracting a first portion corresponding to the first ROI from a second heat map among the first to n-th heat maps, the second heat map being generated by sequentially applying n-th to second filter data to the raw image data, and generating a first top-down heat map by applying the first portion of the second heat map to the first ROI of the first top-down heat map. 'n' is a natural number greater than '2'.

In some embodiments, the method further includes extracting a second ROI from the first top-down heat map, extracting a second portion corresponding to the second ROI from a third heat map among the first to n-th heat maps, the third heat map being generated by sequentially applying the n-th to third filter data to the raw image data, and generating a second top-down heat map by applying the second portion of the third heat map to the second ROI of the first top-down heat map. 'n' is a natural number greater than '3'.

In some embodiments, the generating of the first to n-th heat maps based on the CNN operation of the first to n-th filter data and the raw image data includes generating first to n-th intermediate image data by applying the first to n-th filter data to the raw image data in reverse order, and generating the first to n-th heat maps by applying a class activation map (CAM) operation to each of the first to n-th intermediate image data.

In some embodiments, the first intermediate image data among the first to n-th intermediate image data is generated by sequentially applying a CNN operation of n-th to first filter data to the raw image data, and the first intermediate image data corresponds to the first heat map. The second intermediate image data among the first to n-th intermediate image data is generated by sequentially applying a CNN operation of n-th to second filter data to the raw image data, and the second intermediate image data corresponds to the second heat map.

In some embodiments, a size of the first filter data is smaller than a size of the second filter data.

In some embodiments, the extracting the first ROI from the first heat map among the first to n-th heat maps includes using a hard-mask technique for generating the first ROI based on whether a value of each of elements of the first heat map exceeds a threshold value.

In some embodiments, the image processor is configured to perform the hard-mask technique based on Equation 1 of $$M[i, j] = \begin{cases} 1 & \text{if } H[i, j] > \theta \\ 0 & \text{otherwise} \end{cases}.$$

In Equation 1, 'H' denotes the first heat map, 'M' denotes that the first ROI is extracted from the first heat map, 'i' denotes coordinates of an element in a row direction, 'j' denotes coordinates of the element in a column direction, and '0' denotes a threshold value.

In some embodiments, the extracting the first ROI from the first heat map among the first to n-th heat maps includes using a soft-mask technique for extracting the first ROI based on a difference between a value of each of elements and a maximum value and a minimum value of the elements of the first heat map.

In some embodiments, the image processor is configured to perform the soft-mask technique based on Equation 2 of $$M[i, j] = \frac{H[i, j] - \text{min}H}{\text{max}H - \text{min}H}.$$

In Equation 2, 'H' denotes the first heat map, 'M' denotes that the first ROI is extracted from the first heat map, maxH denotes the greatest value among values of elements of the first heat map, minH denotes the smallest value among values of elements of the first heat map, 'i' denotes coordinates of an element in a row direction, and 'j' denotes coordinates of the element in a column direction.

In some embodiments, the extracting of the first portion corresponding to the first ROI from the second heat map among the first to n-th heat maps includes extracting the first portion corresponding to the first ROI from the second heat map based on Equation 3 of $\overline{L}[i, j]=M[i, j]\times L[i, j]$. In Equation 3, 'M' denotes that the first ROI is extracted from the first heat map, 'H' denotes the second heat map, $\overline{L}$ denotes a first portion, 'i' denotes coordinates of an element in a row direction, and 'j' denotes coordinates of the element in a column direction.

In some embodiments, the generating of the first top-down heat map by applying the first portion to the first ROI of the first heat map includes generating the first top-down heat map by applying the first portion to the first ROI of the first heat map based on Equation 4 of $\overline{H}[i, j]=H[i, j]+\overline{L}[i, j]$. In Equation 4, 'H' denotes the first heat map, $\overline{L}$ denotes the first portion, $\overline{H}$ denotes the first top-down heat map, 'i' denotes coordinates of an element in a row direction, and 'j' denotes coordinates of the element in a column direction.

According to an embodiment, an electronic device includes a memory device that stores raw image data, filter data, and heat maps, and an image processor configured to generate first to n-th heat maps based on a CNN operation of first to n-th filter data and the raw image data, to extract a first ROI from a first heat map among the first to n-th heat maps, to extract a first portion corresponding to the first ROI from a second heat map among the first to n-th heat maps, and to generate a first top-down heat map by applying the first portion of the second heat map to the first ROI of the first heat map. The first heat map is generated by sequentially applying the n-th to first filter data to the raw image data, and the second heat map is generated by sequentially applying the n-th to second filter data to the raw image data. 'n' is a natural number greater than '2'.

In some embodiments, the image processor includes a heat map generator configured to receive first to n-th filter data and the raw image data from the memory device, to generate the first heat map by sequentially applying the n-th to first filter data to the raw image data, and to generate the second heat map by sequentially applying the n-th to second filter data to the raw image data, an ROI extractor configured to receive the first heat map from the heat map generator and to extract the first ROI from the first heat map, and a heat map manager configured to receive the first heat map and the second heat map from the heat map generator, to receive the first ROI from the ROI extractor, to extract a first portion corresponding to the first ROI from the second heat map, and to generate the first top-down heat map by applying the first portion of the second heat map to the first ROI of the first heat map.

In some embodiments, the heat map generator is further configured to generate a third heat map among the first to n-th heat maps by sequentially applying n-th to third filter data to the raw image data. The ROI extractor is further configured to extract a second ROI from the first top-down heat map. The heat map manager is further configured to extract a second portion corresponding to the second ROI from the third heat map among the first to n-th heat maps, and to generate a second top-down heat map by applying the second portion of the third heat map to the second ROI of a first top-down heat map. 'n' is a natural number greater than '3'.

In some embodiments, the heat map generator is further configured to generate an n-th intermediate image data by applying the n-th filter data to the raw image data and to generate the n-th heat map among the first to n-th heat maps by applying a CAM operation to the n-th intermediate image data, and to generate an (n−1)-th intermediate image data by applying the (n−1)-th filter data to the n-th intermediate image data, and to generate the (n−1)-th heat map among the first to n-th heat maps by applying a CAM operation to the (n−1)-th intermediate image data.

BRIEF DESCRIPTION OF THE FIGURES

The above and other objects and features of the present disclosure will become apparent by describing in detail embodiments thereof with reference to the accompanying drawings.

FIG. 1 is a block diagram illustrating an electronic device, according to an embodiment of the present disclosure.

FIG. 4 is a diagram for describing an operation of generating a plurality of heat maps in one neural network, according to some embodiments of the present disclosure.

DETAILED DESCRIPTION

Figure 2:
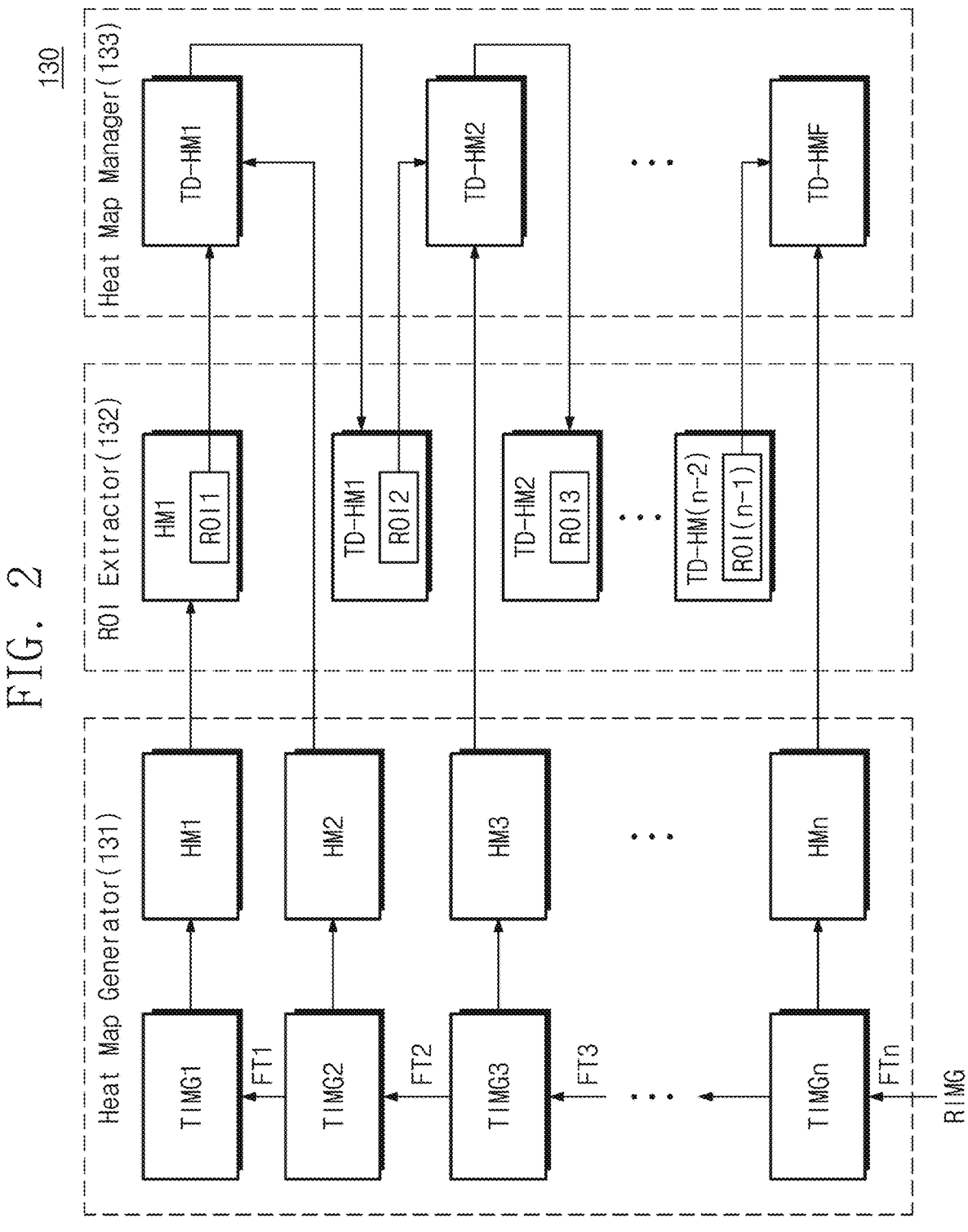
FIG. 2 is a diagram illustrating an operation of an image processor of FIG. 1, according to some embodiments of the present disclosure.

Below, embodiments of the present disclosure will be described in detail and clearly to such an extent that an ordinary one in the art easily implements the present disclosure.

The terms "unit", "module", etc. to be used below and function blocks illustrated in drawings may be implemented in the form of a software component, a hardware component, or a combination thereof. Below, to describe the technical idea of the present disclosure clearly, a description associated with identical components will be omitted.

Figure 1:
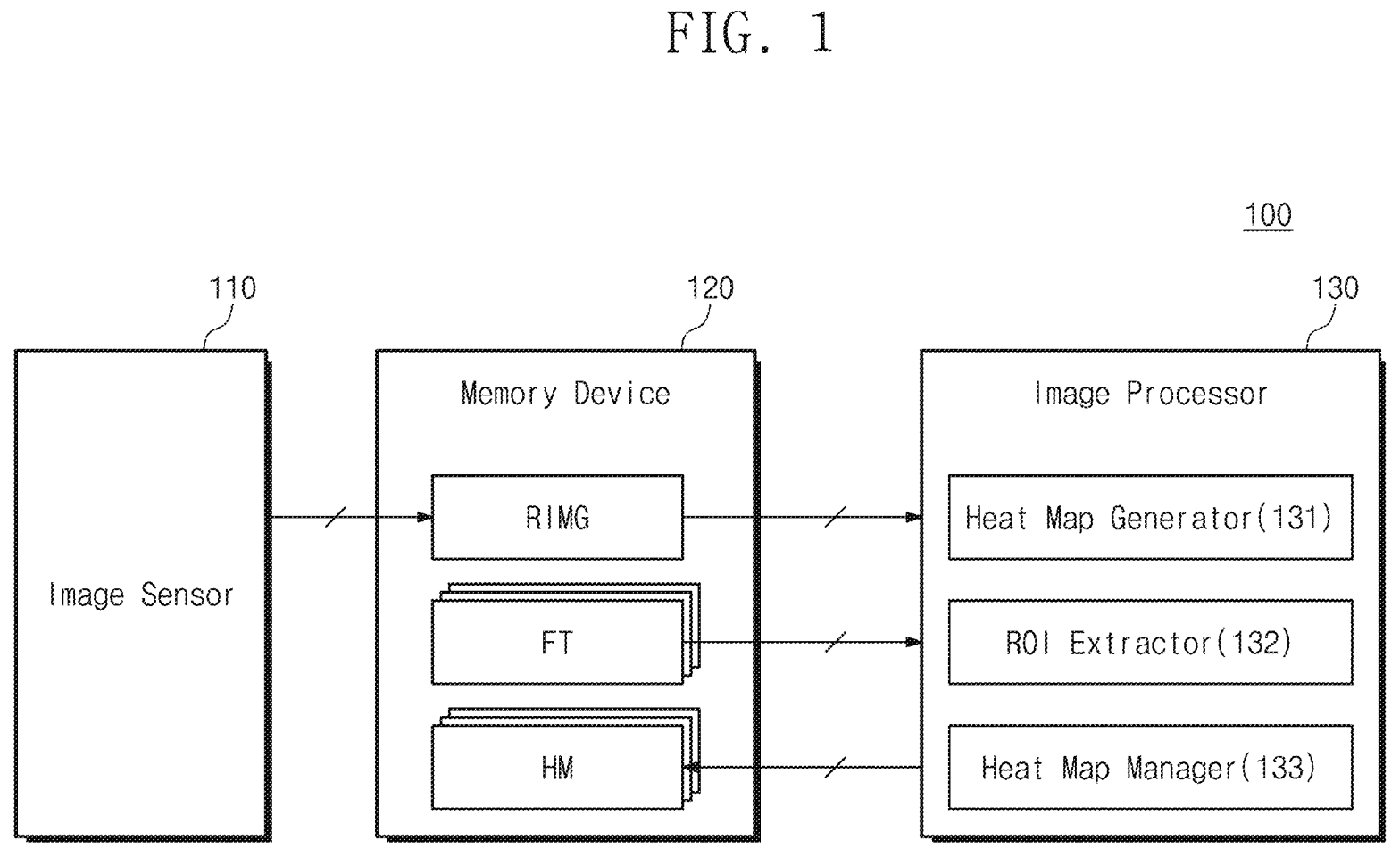

FIG. 1 is a block diagram illustrating an electronic device, according to an embodiment of the present disclosure. Referring to FIG. 1, an electronic device 100 according to an embodiment of the present disclosure is illustrated. The electronic device 100 may be a device that extracts or determines an object by analyzing image data. For example, the electronic device 100 may be implemented as one of various electronic devices that process image data, such as a smart phone, a tablet personal computer (PC), a mobile phone, a desktop PC, a laptop, and a personal digital assistant (PDA).

The electronic device 100 may include an image sensor 110, a memory device 120, and an image processor 130.

The image sensor 110 may generate raw image data RIMG. For example, the image sensor 110 may generate the raw image data RIMG by photographing a background including an object. The raw image data RIMG may include a background region that is not related to the object.

The memory device 120 may store the raw image data RIMG, filter data FT, and heat map HM. The memory device 120 may provide the raw image data RIMG and the filter data FT to the image processor 130.

The filter data FT may include pre-learned values to recognize or determine an object in a convolution neural network (CNN) operation. The filter data FT may refer to a matrix of a filter size, and the matrix may include a plurality of elements arranged in rows and columns. Each of the plurality of elements may have a pre-learned one-dimensional value. The filter data may be referred to as "weight data" or "kernel data".

The heat map HM may be matrix-type data including a plurality of temperature regions arranged in rows and columns. Also, the plurality of temperature regions may be referred to as a plurality of "elements".

Each of the plurality of temperature regions may have a temperature level value proportional to a probability corresponding to ROI. Each of a plurality of temperature regions may be represented in colors different depending on temperature level values. For example, when a specific temperature region is highly likely to correspond to the ROI, the specific temperature region may be displayed in red and may be referred to as a "hot region". When another specific temperature region is low likely to correspond to the ROI, the other specific temperature region may be displayed in blue and may be referred to as a "cold region".

The image processor 130 may receive the raw image data RIMG and the filter data FT from the memory device 120. The image processor 130 may generate the heat maps HM based on the raw image data RIMG and the filter data FT.

The image processor 130 may use CAM and grad-CAM techniques as examples of techniques for interpreting data used as a basis when a neural network determines an object. That is, the image processor 130 may generate the heat maps HMs by using the CAM and grade-CAM techniques based on the raw image data RIMG and the filter data FT. The image processor 130 may provide the heat map HM to the memory device 120.

The image processor 130 may include a heat map generator 131, an ROI extractor 132, and a heat map manager 133. The heat map generator 131, the ROI extractor 132, and the heat map manager 133 may be implemented as hardware, software, or a combination of hardware and software, which performs a series of operations to present a basis for the convolutional neural network to recognize or determine an object from raw image data, The heat map generator 131 may receive the raw image data RIMG and the filter data FT from the memory device 120. The heat map generator 131 may generate the heat maps HM by applying the filter data FT to the raw image data RIMG. The heat map generator 131 may provide the heat maps HM to the ROI extractor 132 or the heat map manager 133.

The ROI extractor 132 may receive the heat maps HM from the heat map generator 131. The ROI extractor 132 may extract an ROI from the heat maps HM. The ROI extractor 132 may extract the ROI based on a temperature level value of each element of the heat map HM. The ROI extractor 132 may provide the ROI to the heat map manager 133.

The heat map manager 133 may receive the heat maps HM from the heat map generator 131 and may receive the ROI extracted from the ROI extractor 132. The heat map manager 133 may generate the heat map HM, in which a region being the basis for object determination is accurately expressed at a high resolution, by integrating the plurality of heat maps HM based on the extracted ROI and the corresponding portion.

As described above, according to embodiments of the present disclosure, the electronic device 100 may be provided to generate a top-down heat map that accurately presents a basis for object determination at a high resolution, by applying the corresponding portion of the heat map that presents the basis for object determination in the high resolution to the ROI of the heat map that accurately presents the basis for object determination.

FIG. 2 is a diagram illustrating an operation of an image processor of FIG. 1, according to some embodiments of the present disclosure.

The heat map generator 131 may generate first to n-th intermediate image data TIMG1 to TIMGn by applying first to n-th filter data FT1 to FTn to a raw image in reverse order. The first to n-th filter data FT1 to FTn may be different filter data applied to a neural network, and the size of the first filter data FT1 may be smaller than that of the second filter data FT2.

In some embodiments, the n-th filter data FTn may be filter data, which is closest to an input of raw image data and which is applied to a neural network operation.

The heat map generator 131 may generate the n-th intermediate image data TIMGn by applying the n-th filter data FTn to the raw image data RIMG, and may generate the n-th heat map HMn by applying a CAM operation to the n-th intermediate image data TIMGn.

The heat map generator 131 generates the (n–1)-th intermediate image data TIMGn–1 by applying the (n–1)-th filter data FTn–1 to the n-th intermediate image data TIMGn, and may generate the (n–1)-th heat map HMn–1 by applying the CAM operation to the (n–1)-th intermediate image data TIMGn–1.

The heat map generator 131 may generate the (n–2)-th intermediate image data TIMGn–2 by applying the (n–2)-th filter data FTn–2 to the (n–1)-th intermediate image data TIMGn–1, and may generate the (n–2)-th heat map HMn–2 by applying the CAM operation to the (n–2)-th intermediate image data TIMGn–2.

In a similar method to the method described above, the heat map generator 131 may generate the (n–3)-th to first heat maps HMn–3 to HM1. The heat map generator 131 may provide first to n-th heat maps HM1 to HMn to the ROI extractor 132 and the heat map manager 133.

The ROI extractor 132 may receive the first to n-th heat maps HM1 to HMn from the heat map generator 131. The ROI extractor 132 may extract a first ROI from the first heat map HM1.

The heat map manager 133 may receive the first ROI from the ROI extractor 132. The heat map manager 133 may receive the first to n-th heat maps HM1 to HMn from the heat map generator 131. The heat map manager 133 may generate first to (n–1)-th top-down heat maps TD-HM1 to TD-HMn–1 based on the first to n-th heat maps HM1 to HMn.

Assuming that the first heat map HM1 is set as the highest heat map, and the n-th heat map HMn is set as the lowest heat map, the top-down heat map may be a heat map obtained by sequentially integrating the second to n-th heat maps HM2 to HMn with the first heat map HM1. In other words, the top-down heat map may be referred to as a "heat map obtained by sequentially integrating lower heat maps with an upper heat map.

For example, the heat map generator 131 may extract a first portion corresponding to the first ROI from the second heat map HM2. Moreover, the heat map generator 131 may generate the first top-down heat map TD-HM1 by applying the first portion of the second heat map HM2 to the first ROI of the first heat map HM1. That is, applying the first portion of the second heat map HM2 to the first ROI of the first heat map HM1 may refer to integrating the first portion of the second heat map HM2 with the first ROI of the first heat map HM1.

The heat map manager 133 may provide the first top-down heat map TD-HM1 to the ROI extractor 132. The ROI extractor 132 may extract a second ROI from the first top-down heat map TD-HM1 and then may provide the second ROI to the heat map manager 133. The heat map manager 133 may extract a second portion corresponding to the second ROI from the third heat map HM3. Moreover, the heat map generator 131 may generate the second top-down heat map TD-HM2 by applying the second portion of the third heat map HM3 to the second ROI of the first top-down heat map TD-HM1.

The heat map manager 133 may provide the second top-down heat map TD-HM2 to the ROI extractor 132. The ROI extractor 132 may extract a third ROI from the second top-down heat map TD-HM2 and then may provide the third ROI to the heat map manager 133. The heat map manager 133 may extract a third portion corresponding to the third ROI from the fourth heat map HM4. Furthermore, the heat map generator 131 may generate the third top-down heat map TD-HM3 by applying the third portion of the fourth heat map HM4 to the third ROI of the second top-down heat map TD-HM2.

In a similar method to the method described above, the heat map manager 133 may generate the fourth to (n−1)-th top-down heat maps TD-HM4 to TD-HMn−1. The (n−1)-th top-down heat map TD-HMn−1 may be referred to as a "final top-down heat map TD-HMF".

Figure 3:
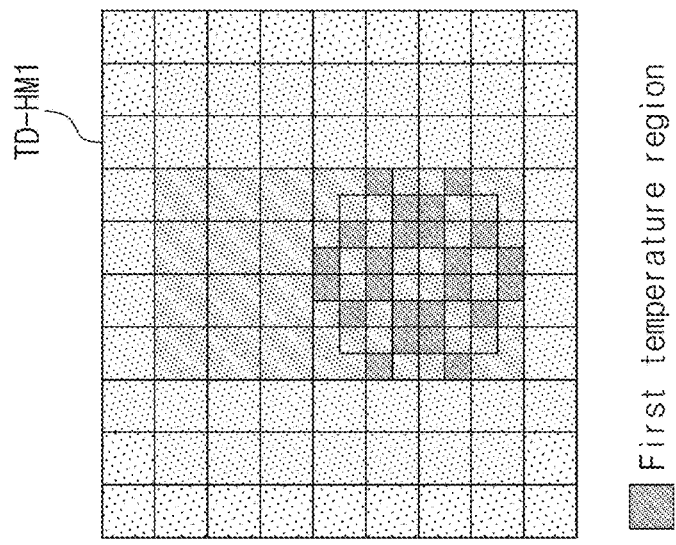
FIG. 3 is a diagram illustrating a process of generating a top-down heat map, according to some embodiments of the present disclosure.
Figure 3:
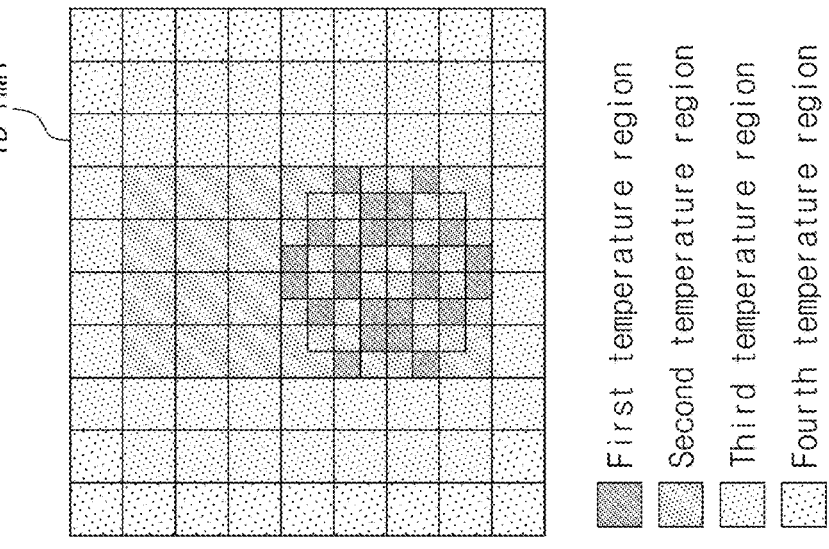
Figure 3:
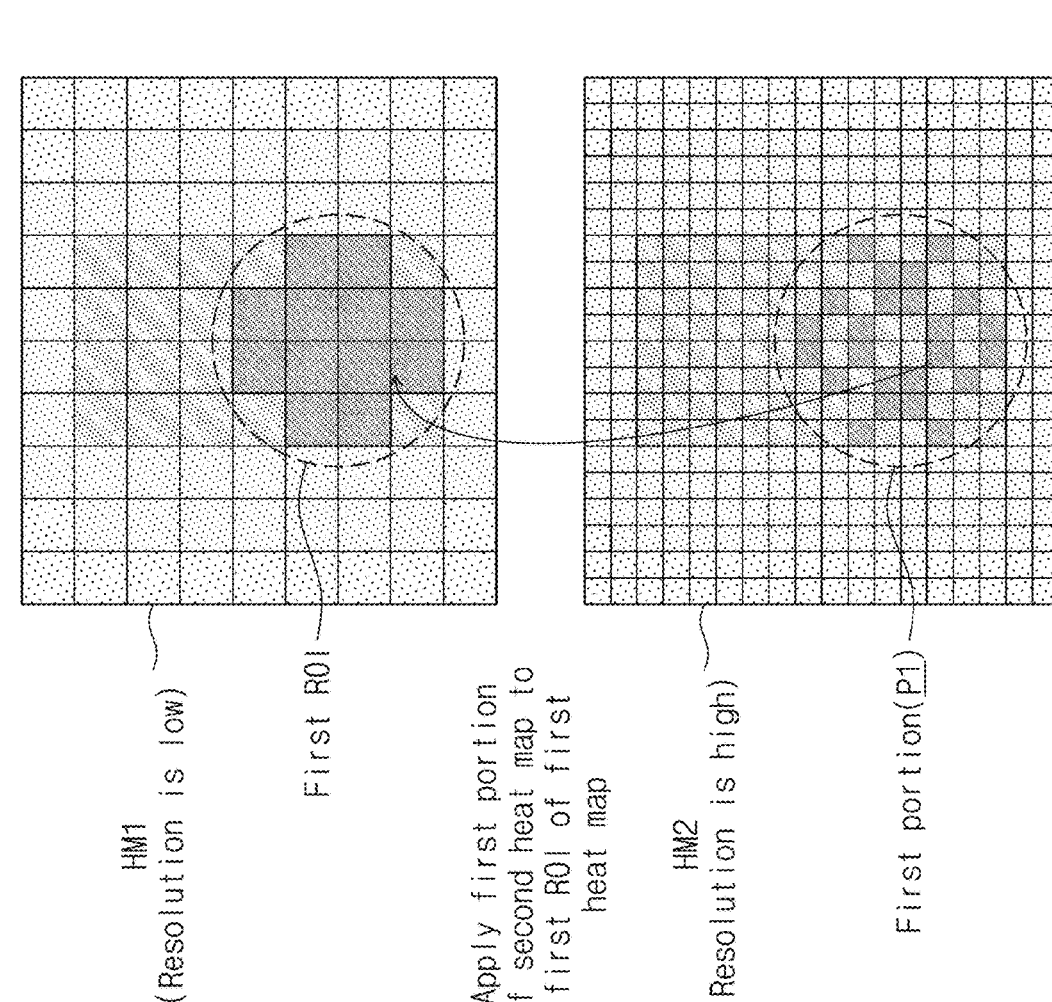

FIG. 3 is a diagram illustrating a process of generating a top-down heat map, according to some embodiments of the present disclosure.

The first heat map HM1, the second heat map HM2, the first top-down heat map TD-HM1, and the first ROI of FIG. 3 may correspond to the first heat map HM1, the second heat map HM2, the first top-down heat map TD-HM1, the first ROI of FIG. 2, respectively. The resolution of the first heat map HM1 may be lower than that of the second heat map HM2.

Each of the first heat map HM1, the second heat map HM2, and the first top-down heat map TD-HM1 may include a plurality of temperature regions. In FIG. 3, a temperature region having a first temperature level value may be referred to as a first temperature region; a temperature region having a second temperature level value may be referred to as a second temperature region; a temperature region having a third temperature level value may be referred to as a third temperature region; and, a temperature region having a fourth temperature level value may be referred to as a fourth temperature region. The first temperature region may be more likely to correspond to the ROI than the second temperature region. The second temperature region may be more likely to correspond to the ROI than the third temperature region. The third temperature region may be more likely to correspond to the ROI than the fourth temperature region.

For better understanding of the present disclosure, FIG. 3 shows that a temperature region of each of the first heat map HM1, the second heat map HM2, and the first top-down heat map TD-HM1 has one of the first to fourth temperature level values, but the scope of the present disclosure is not limited thereto. The number of subdivided temperature level values within a heat map such as the first heat map HM1, the second heat map HM2, and the first top-down heat map TD-HM1 may increase or decrease.

The image processor may extract an ROI based on the temperature level value of each element of the first heat map HM1. Elements of the first heat map HM1 may be referred to as temperature regions of the first heat map HM1.

In some embodiments, the image processor may extract the ROI by using a hard-mask technique. For example, the hard-mask technique may refer to generating a first ROI based on whether a value of each element of the first heat map HM1 exceeds a threshold value. The threshold value may be a temperature level value that is a criterion for ROI determination in the hard-mask technique.

For example, the hard-mask technique extracts the first ROI from the first heat map HM1 based on equation $$M[i, j] = \begin{cases} 1 & \text{if } H[i, j] > \theta \\ 0 & \text{otherwise} \end{cases}.$$

In this case, 'H' denotes the first heat map HM1; 'M' denotes that the first ROI is extracted from the first heat map HM1; 'i' denotes coordinates of an element in a row direction; 'j' denotes coordinates of an element in a column direction; and, 'θ' denotes a threshold value.

In some embodiments, the image processor may extract the ROI by using a soft-mask technique. For example, the soft-mask technique may refer to extracting the first ROI based on a difference between a value of each of elements and the maximum value and the minimum value of elements of the first heat map HM1.

For example, the soft-mask technique extracts the first ROI from the first heat map HM1 based on Equation $$M[i, j] = \frac{H[i, j] - \min H}{\max H - \min H}.$$

In this case, 'H' denotes the first heat map HM1; 'M' denotes that the first ROI is extracted from the first heat map HM1; maxH denotes the greatest value among values of elements of the first heat map HM1; minH denotes the smallest value among values of elements of the first heat map HM1; 'i' denotes coordinates of an element in a row direction; and 'j' denotes coordinates of an element in a column direction.

The image processor may extract a first portion corresponding to the first ROI from the second heat map HM2.

For example, the image processor may extract a first portion corresponding to the first ROI from the second heat map HM2 by using Equation $L[i, j] = M[i, j] \times L[i, j]$. In this case, 'M' denotes that the first ROI is extracted from the first heat map HM1; 'H' denotes the second heat map HM2; $L$ denotes a first portion; 'i' denotes coordinates of an element in a row direction; and, 'j' denotes coordinates of an element in a column direction.

The image processor may generate the first top-down heat map TD-HM1 by applying the first portion of the second heat map HM2 to the first ROI of the first heat map HM1.

For example, the image processor may generate the first top-down heat map TD-HM1 by applying a first portion P1 to the first ROI of the first heat map HM1 by using Equation $H[i, j] = H[i, j] + L[i, j]$. In the equation, 'H' denotes the first heat map; $L$ denotes the first portion; $H$ denotes the first top-down heat map; 'i' denotes coordinates of an element in a row direction; and, 'j' denotes coordinates of an element in a column direction.

Figure 4:
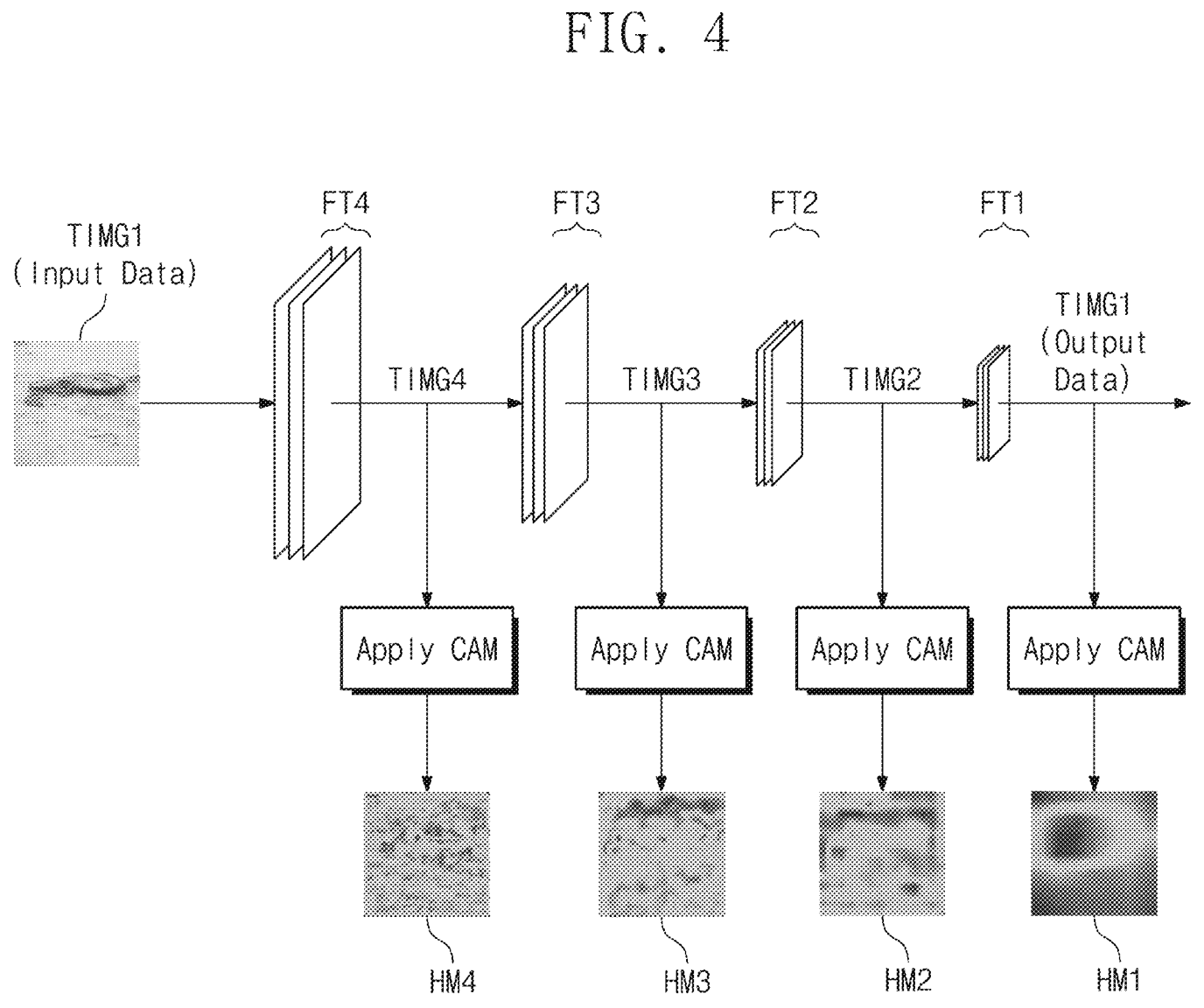

FIG. 4 is a diagram for describing an operation of generating a plurality of heat maps in one neural network, according to some embodiments of the present disclosure. Referring to FIG. 4, when 'n' is 4, a difference in resolution between the first heat map HM1 to fourth heat map HM4 may be described.

When 'n' is 4, an image processor may generate the fourth intermediate image data TIMG4 by applying the fourth filter data FT4 to the raw image data RIMG, and may generate the fourth heat map HM4 by applying a CAM operation to the fourth intermediate image data TIMG4.

The image processor may generate the third intermediate image data TIMG3 by applying the third filter data FT3 to the fourth intermediate image data TIMG4. The size of the third filter data FT3 is smaller than that of the fourth filter data FT4. The third heat map HM3 may be generated by applying the CAM operation to the third intermediate image data TIMG3.

The image processor may generate the second intermediate image data TIMG2 by applying the second filter data FT2 to the third intermediate image data TIMG3. The size of the second filter data FT2 is smaller than the size of the third filter data FT3. The second heat map HM2 may be generated by applying the CAM operation to the second intermediate image data TIMG2.

The image processor may generate the first intermediate image data TIMG1 by applying the first filter data FT1 to the second intermediate image data TIMG2. The size of the first filter data FT1 is smaller than the size of the second filter data FT2. The first heat map HM1 may be generated by applying the CAM operation to the first intermediate image data TIMG1.

In this case, the first heat map HM1 may accurately recognize elements (e.g., pixels indicating regions on which object determination is based) that are the basis for object determination. However, the resolution of recognized elements may be lower than the resolution of elements recognized in the second to fourth heat maps HM2 to HM4.

On the other hand, the resolution of elements recognized in the fourth heat map HM4 may be higher than that of elements recognized in the first to third heat maps HM1 to HM3. However, elements that are the basis for object determination may not be accurately recognized. For example, the size of each of pixels corresponding to elements in the fourth heat map HM4 may be smaller than the size of each of pixels corresponding to elements recognized in the first to third heat maps HM1 to HM3. However, the fourth heat map HM4 may mistakenly recognize a background unrelated to the object or another subject as a basis for object determination.

Figure 5:
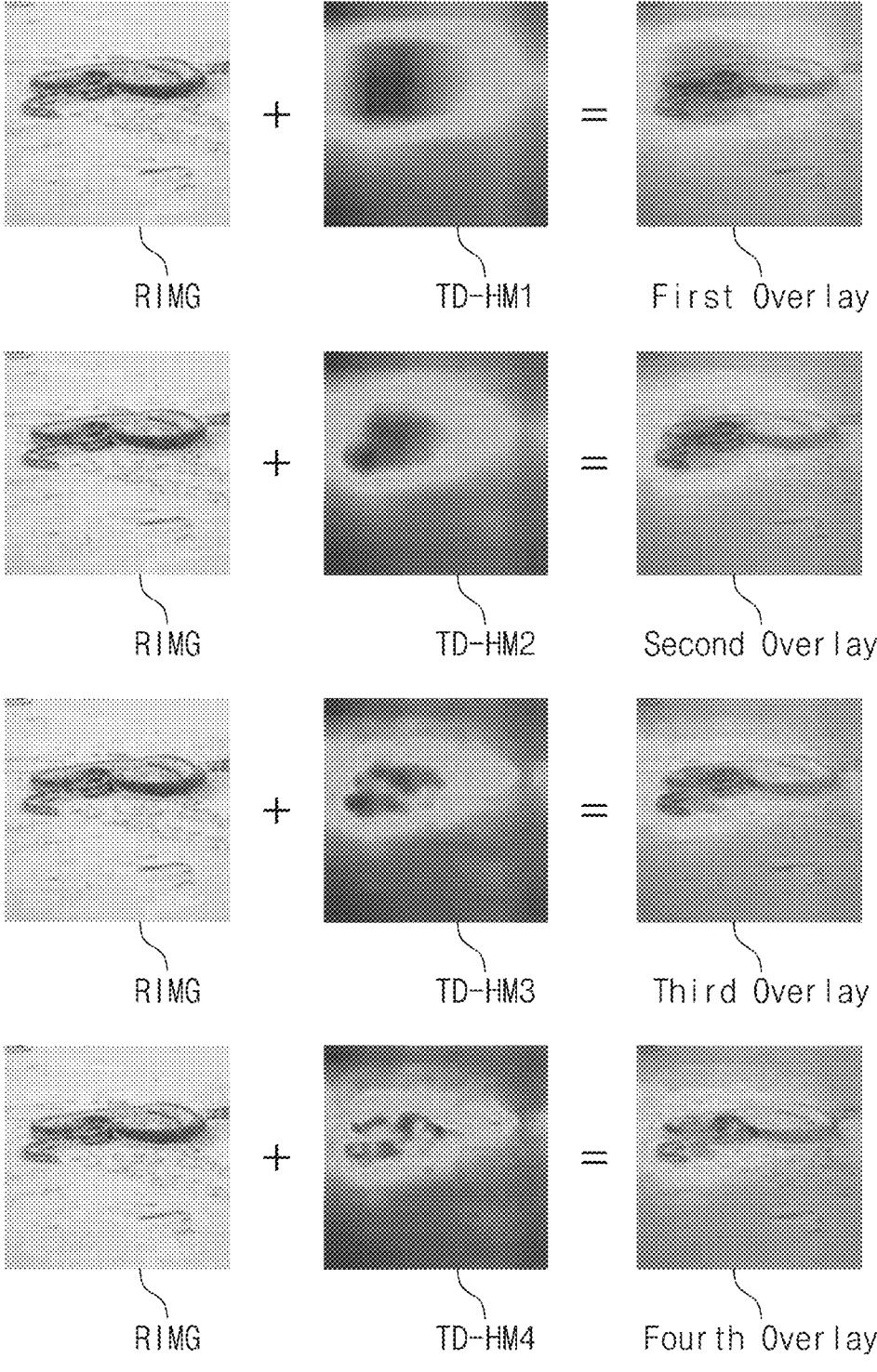
FIG. 5 illustrates overlay diagrams of top-down heat maps, according to some embodiments of the present disclosure.

FIG. 5 illustrates overlay diagrams of top-down heat maps, according to some embodiments of the present disclosure. The raw image data RIMG and the first to fourth top-down heat maps TD-HM1 to TD-HM4 of FIG. 5 correspond to the raw image data RIMG and the first to fourth top-down heat maps TD-HM1 to TD-HM4 of FIG. 2, respectively.

An overlay diagram may be a diagram obtained by superimposing top-down heat maps on the raw image data RIMG.

The first overlay may be obtained by superimposing the first top-down heat map TD-HM1 on the raw image data RIMG. The second overlay may be obtained by superimposing the second top-down heat map TD-HM2 on the raw image data RIMG. The third overlay may be obtained by superimposing the third top-down heat map TD-HM3 on the raw image data RIMG. The fourth overlay may be obtained by superimposing the third top-down heat map TD-HM4 on the raw image data RIMG.

According to some embodiments, the raw image data RIMG may be image data including a shape of a target object that is a snake. While a snake-shaped portion in the raw image data RIMG is displayed as a region having a high temperature level value, the fourth overlay may be displayed in a higher resolution than the first overlay.

Figure 6:
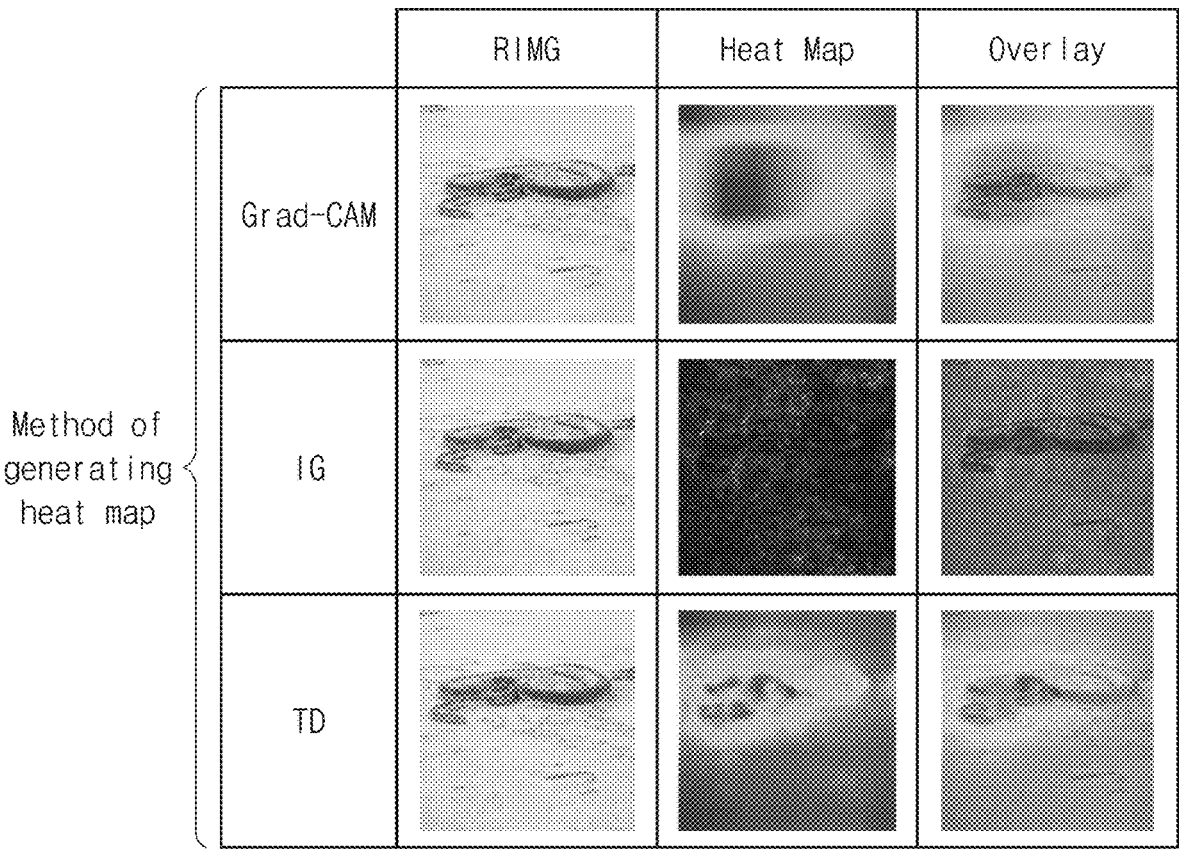
FIG. 6 is a diagram illustrating a top-down heat map generated according to some embodiments of the present disclosure and heat maps generated according to other heat map generation techniques.

FIG. 6 is a diagram illustrating a top-down heat map generated according to some embodiments of the present disclosure and heat maps generated according to other heat map generation techniques.

Grad-CAM technique and IG technique may be used as examples of techniques for interpreting data that is the basis for object determination in a neural network. The Grad-CAM technique and the IG technique may generate a heat map that displays elements, which are the basis for object determination in a neural network, with high temperature level values.

The Grad-CAM technique may refer to generating a heat map from final image data obtained by sequentially applying pieces of filter data to raw image data.

The IG technique may refer to generating a heat map directly from the raw image data to which filter data is not applied.

A heat map generated by a heat map generation technique TD of the present disclosure may have a higher resolution than a heat map generated by Grad-CAM technique.

Compared to the heat map generated through IG technique, the heat map generated by the heat map generation technique TD of the present disclosure may accurately display elements that are the basis for object determination of the convolutional neural network.

Figure 7:
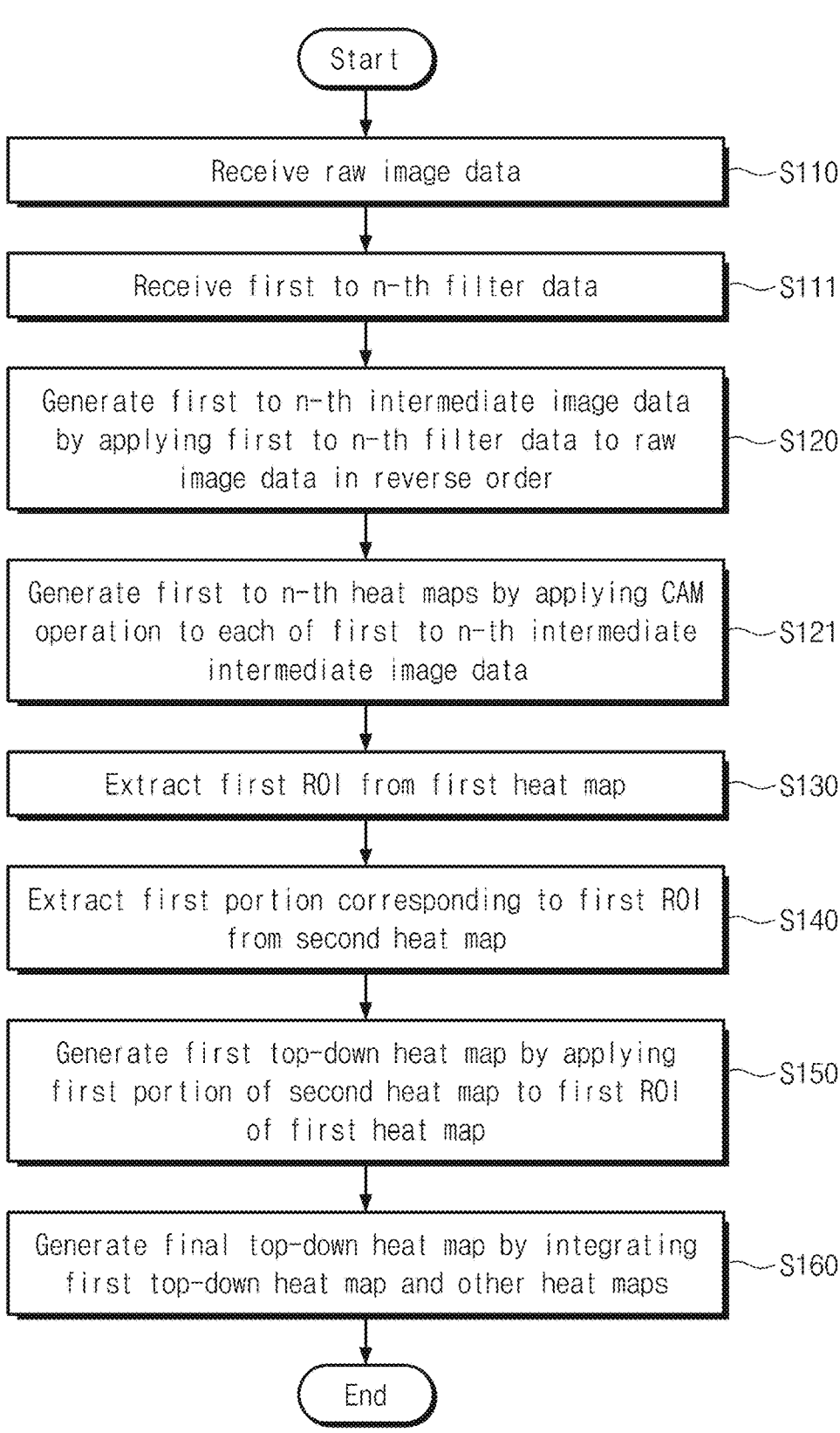
FIG. 7 is a flowchart illustrating an operating method of an image processor, according to some embodiments of the present disclosure.

FIG. 7 is a flowchart illustrating an operating method of an image processor, according to some embodiments of the present disclosure. An image processor of FIG. 7 corresponds to the electronic device 100 of FIG. 1.

In operation S110, the image processor may receive raw image data from a memory device.

In operation S111, the image processor may receive first to n-th filter data from the memory device.

In operation S120, the image processor may generate first to n-th intermediate image data by applying the first to n-th filter data to the raw image data in reverse order. For example, the applying of the first to n-th filter data to the raw image data in reverse order may refer to sequentially applying a CNN operation of the n-th to first filter data to the raw image data.

In more detail, the n-th intermediate image data may be generated by applying the CNN operation of the n-th filter data to the raw image data. The (n−1)-th intermediate image data may be generated by sequentially applying the CNN operation of the n-th and (n−1)-th filter data to the raw image data. The (n−2)-th intermediate image data may be generated by sequentially applying the CNN operation of the n-th to (n−2)-th filter data to the raw image data. As in the above description, the second intermediate image data may be generated by sequentially applying the CNN operation of n-th to second filter data to the raw image data. The first intermediate image data may be generated by sequentially applying the CNN operation of the n-th to first filter data to the raw image data.

In other words, operation S120 may include generating the n-th intermediate image data by applying the n-th filter data to the raw image data, generating the (n−1)-th intermediate image data by applying the (n−1)-th filter data to the n-th intermediate image data, and generating the (n−2)-th to first intermediate image data in a similar method to a method described above.

In operation S121, the image processor may generate the first to n-th heat maps by applying the CAM operation to each of the first to n-th intermediate image data. Each of the first to n-th intermediate image data may correspond to first to n-th heat maps.

In more detail, operation S121 may include generating the n-th heat map by applying the CAM operation to the n-th intermediate image data, generating the (n−1)-th heat map by applying the CAM operation to the (n−1)-th intermediate image data, and generating the (n−2)-th to first heat maps in a similar method to a method described above.

In operation S130, the image processor may extract a first ROI from the first heat map.

In some embodiments, in operation S130, this may include extracting the first ROI from the first heat map by using a hard-mask technique or a soft-mask technique.

In operation S140, the image processor may extract a first portion corresponding to the first ROI from the second heat map.

In operation S150, the image processor may generate a first top-down heat map by applying the first portion of the second heat map to the first ROI of the first heat map. In other words, this may refer to integrating the first heat map and the second heat map based on the first ROI.

In operation S160, the image processor may generate a final top-down heat map by integrating a first top-down heat map and other heat maps.

For example, the image processor may extract a second ROI of the first top-down heat map, may extract a second portion corresponding to the second ROI from the third heat map, and may generate a second top-down heat map by applying the second portion of the third heat map to the second ROI of the first top-down heat map. The image processor may extract a third ROI of the second top-down heat map, may extract a third portion corresponding to the third ROI from the fourth heat map, and may generate a third top-down heat map by applying the third portion of the fourth heat map to the third ROI of the second top-down heat map. As in the above description, the image processor may extract an (n−1)-th ROI of the (n−2)-th top-down heat map, may extract an (n−1)-th portion corresponding to the (n−1)-th ROI from the n-th heat map, and may generate the final top-down heat map by applying the (n−1)-th portion of the n-th heat map to the (n−1)-th ROI of the (n−2)-th top-down heat map. The final top-down heat map may be referred to as a "(n−1)-th top-down heat map".

The final top-down heat map may accurately display elements, which are the basis for the object determination of a convolutional neural network, at a high resolution. For example, each of elements in the final top-down heat map may be displayed with a high temperature level value as the probability of being the basis for object determination increases, and may be displayed with a low temperature level value as the probability of being the basis for object determination decreases. The above description refers to detailed embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

Embodiments of the present disclosure provide an operating method of an image processor generating a top-down heat map, and an electronic device including the image processor.

Moreover, an image processor that creates a top-down heat map for accurately presenting the basis for object determination at a high resolution is provided by applying the corresponding portion of a heat map for presenting the basis for object determination in the high resolution to region of interest (ROI) of a heat map for accurately presenting the basis for object determination.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of an image processor communicating with a memory device, the method comprising:
   receiving raw image data from the memory device;
   receiving first to n-th filter data from the memory device;
   generating first to n-th heat maps based on a convolution neural network (CNN) operation of the first to n-th filter data and the raw image data;
   extracting a first region of interest (ROI) from a first heat map among the first to n-th heat maps, wherein the first heat map is generated by sequentially applying n-th to first filter data to the raw image data;
   extracting a first portion from a second heat map among the first to n-th heat maps, the first portion corresponding to the first ROI, wherein the second heat map is generated by sequentially applying n-th to second filter data to the raw image data; and
   generating a first top-down heat map by applying the first portion of the second heat map to the first ROI of the first heat map,
   wherein 'n' is a natural number greater than '2'.

2. The method of claim 1, further comprising:
   extracting a second ROI from the first top-down heat map;
   extracting a second portion from a third heat map among the first to n-th heat maps, the second portion corresponding to the second ROI, wherein the third heat map is generated by sequentially applying the n-th to third filter data to the raw image data; and
   generating a second top-down heat map by applying the second portion of the third heat map to the second ROI of the first top-down heat map,
   wherein 'n' is a natural number greater than '3'.

3. The method of claim 1, wherein the generating of the first to n-th heat maps based on the CNN operation of the first to n-th filter data and the raw image data includes:
   generating first to n-th intermediate image data by applying the first to n-th filter data to the raw image data in reverse order; and
   generating the first to n-th heat maps by applying a class activation map (CAM) operation to each of the first to n-th intermediate image data.

4. The method of claim 3, wherein the first intermediate image data among the first to n-th intermediate image data is generated by sequentially applying a CNN operation of n-th to first filter data to the raw image data, and the first intermediate image data corresponds to the first heat map, and
   wherein the second intermediate image data among the first to n-th intermediate image data is generated by sequentially applying a CNN operation of n-th to second filter data to the raw image data, and the second intermediate image data corresponds to the second heat map.

5. The method of claim 1, wherein a size of the first filter data is smaller than a size of the second filter data.

6. The method of claim 1, wherein the extracting the first ROI from the first heat map among the first to n-th heat maps includes:
using a hard-mask technique for generating the first ROI based on whether a value of each of elements of the first heat map exceeds a threshold value.

7. The method of claim 6, wherein the image processor is configured to perform the hard-mask technique based on Equation 1:

$$M[i, j] = \begin{cases} 1 & \text{if } H[i, j] > \theta \\ 0 & \text{otherwise} \end{cases}, \qquad \text{[Equation 1]}$$

and
wherein, in Equation 1, 'H' denotes the first heat map, 'M' denotes that the first ROI is extracted from the first heat map, 'i' denotes coordinates of an element in a row direction, 'j' denotes coordinates of the element in a column direction, and 'θ' denotes a threshold value.

8. The method of claim 1, wherein the extracting the first ROI from the first heat map among the first to n-th heat maps includes:
using a soft-mask technique for extracting the first ROI based on a difference between a value of each of elements of the first heat map for a maximum value and a minimum value of the elements.

9. The method of claim 8, wherein the image processor is configured to perform the soft-mask technique based on Equation 2:

$$M[i, j] = \frac{H[i, j] - \min H}{\max H - \min H}, \qquad \text{[Equation 2]}$$

and
wherein, in Equation 2, 'H' denotes the first heat map, 'M' denotes that the first ROI is extracted from the first heat map, maxH denotes the greatest value among values of elements of the first heat map, minH denotes the smallest value among values of elements of the first heat map, 'i' denotes coordinates of an element in a row direction, and 'j' denotes coordinates of the element in a column direction.

10. The method of claim 1, wherein the extracting of the first portion corresponding to the first ROI from the second heat map among the first to n-th heat maps includes:
extracting the first portion corresponding to the first ROI from the second heat map based on Equation 3:

$$L[i, j] = M[i, j] \times L[i, j], \qquad \text{[Equation 3]}$$

and
wherein, in Equation 3, 'M' denotes that the first ROI is extracted from the first heat map, 'H' denotes the second heat map, L denotes a first portion, 'i' denotes coordinates of an element in a row direction, and 'j' denotes coordinates of the element in a column direction.

11. The method of claim 1, wherein the generating of the first top-down heat map by applying the first portion to the first ROI of the first heat map includes:
generating the first top-down heat map by applying the first portion to the first ROI of the first heat map based on Equation 4:

$$\overline{H}[i, j] = H[i, j] + L[i, j], \qquad \text{[Equation 4]}$$

and
wherein, in Equation 4, 'H' denotes the first heat map, L denotes the first portion, H̅ denotes the first top-down heat map, 'i' denotes coordinates of an element in a row direction, and 'j' denotes coordinates of the element in a column direction.

12. An electronic device comprising:
a memory device configured to store raw image data, filter data, and heat maps; and
an image processor configured to:
generate first to n-th heat maps based on a CNN operation of first to n-th filter data and the raw image data;
extract a first ROI from a first heat map among the first to n-th heat maps;
extract a first portion from a second heat map among the first to n-th heat maps, the first portion corresponding to the first ROI; and
generate a first top-down heat map by applying the first portion of the second heat map to the first ROI of the first heat map,
wherein the first heat map is generated by sequentially applying the n-th to first filter data to the raw image data, and the second heat map is generated by sequentially applying the n-th to second filter data to the raw image data, and
wherein 'n' is a natural number greater than '2'.

13. The electronic device of claim 12, wherein the image processor includes:
a heat map generator configured to receive first to n-th filter data and the raw image data from the memory device, to generate the first heat map by sequentially applying the n-th to first filter data to the raw image data, and to generate the second heat map by sequentially applying the n-th to second filter data to the raw image data;
an ROI extractor configured to receive the first heat map from the heat map generator and to extract the first ROI from the first heat map; and
a heat map manager configured to receive the first heat map and the second heat map from the heat map generator, to receive the first ROI from the ROI extractor, to extract a first portion corresponding to the first ROI from the second heat map, and to generate the first top-down heat map by applying the first portion of the second heat map to the first ROI of the first heat map.

14. The electronic device of claim 13, wherein the heat map generator is further configured to:
generate a third heat map among the first to n-th heat maps by sequentially applying n-th to third filter data to the raw image data,
wherein the ROI extractor is further configured to extract a second ROI from the first top-down heat map, wherein the heat map manager is further configured to:

extract a second portion from the third heat map among the first to n-th heat maps, the second portion corresponding to the second ROI; and generate a second top-down heat map by applying the second portion of the third heat map to the second ROI of a first top-down heat map, and wherein 'n' is a natural number greater than '3'.

15. The electronic device of claim 13, wherein the heat map generator is further configured to:

generate an n-th intermediate image data by applying the n-th filter data to the raw image data and generate the n-th heat map among the first to n-th heat maps by applying a CAM operation to the n-th intermediate image data; and generate an (n−1)-th intermediate image data by applying the (n−1)-th filter data to the n-th intermediate image data, and generate the (n−1)-th heat map among the first to n-th heat maps by applying a CAM operation to the (n−1)-th intermediate image data.

* * * * *